March 13, 1962 R. E. LOVEJOY 3,025,510

DIGITAL ANALOG CONVERTER

Filed Oct. 24, 1957 6 Sheets-Sheet 1

INVENTOR:
Rex E. Lovejoy

By Smyth & Roston
Attorneys.

Fig. 2
Permuted Binary Code
| Decimal Numbers | 1 | 2 | 2' | 4 |
|---|---|---|---|---|
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |
Fig. 3
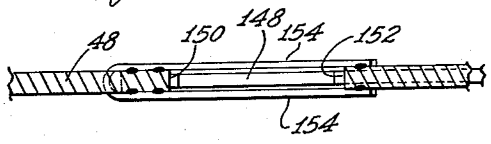
Fig. 4
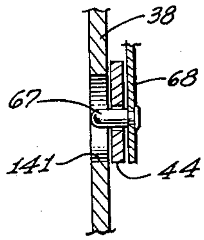
Fig. 5
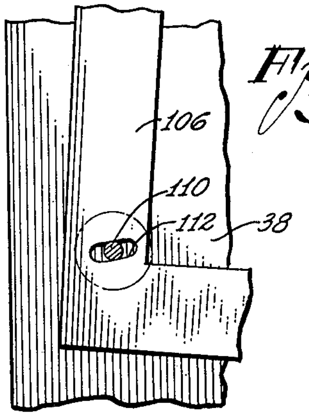
Fig. 6
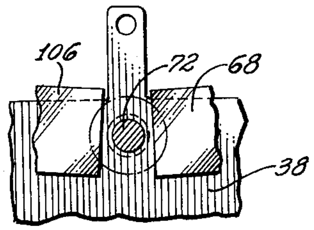
INVENTOR:
Rex E. Lovejoy
By Smyth & Roston
Attorneys, INVENTOR:
Rex E. Lovejoy
By Smyth & Roston
Attorneys.

INVENTOR
Rex E. Lovejoy
By Smyth & Roston
Attorneys

INVENTOR:
Rex E. Lovejoy
By Smyth & Roston
Attorneys

DIGITAL ANALOG CONVERTER

Filed Oct. 24, 1957 6 Sheets-Sheet 6

INVENTOR:
Rex E. Lovejoy
By Smyth & Roston
Attorneys.

United States Patent Office 3,025,510

Patented Mar. 13, 1962

3,025,510

DIGITAL ANALOG CONVERTER

Rex E. Lovejoy, Los Angeles, Calif., assignor to Computer Measurements Corporation, Hollywood, Calif., a corporation of California Filed Oct. 24, 1957, Ser. No. 692,089
12 Claims. (Cl. 340—347)

This invention relates to a digital transducer to convert binary data into corresponding analog of mechanical movement. The invention may be used for remote or automatic control of various devices including valves and switches and may be used to convert a digital output command into actuation of read-out devices such as printers, perforators and tape transmitters.

The initial embodiment of the invention is a digital actuator controlled by binary signals for actuating a decimal system printing means such as the printing mechanism of an adding machine or the like. This initial embodiment of the invention is described in detail herein by way of example and affords adequate guidance for those skilled in the art who may have occasion to apply the same principles to other specific purposes.

The invention provides an electro-mechanical conversion matrix which comprises an assembly of relative movable interlocked members together with selective latch means to hold these members against movement relative to each other. The latch means are selectively operated singly and in groups by corresponding signal-responsive electro-magnets to permit the assembly of interlocked members to expand to various degrees. In the present embodiment of the invention, the various degrees of expansion of the assembly represent a series of decimal digits and the expansion of the assembly is transmitted in any suitable manner to an output means which functions as a read-out means.

In the present practice of the invention, the expansible assembly together with the plurality of latch-releasing electro-magnets functions as a selective stop mechanism to arrest the movement of a yieldingly actuated output means at positions corresponding to the selected values. The digit positions of the binary numbers are represented by the respective electro-magnets and the output positions correspond to the decimal numerals.

The expansible assembly or selective stop mechanism is controlled by a progressive series of binary numbers having four digits and the assembly of interlocking members provides for four separate ranges of relative movement which correspond to the four digit positions of the binary numbers. The four separate ranges of relative movement are of magnitudes for use individually and additively to represent the values of all of the decimal digits 1 to 9, 0 being represented by the absence of any significant relative movement in the assembly. Thus the four separate ranges may have magnitudes corresponding to 1, 2, 3 and 4 units respectively, or values corresponding to 1, 2, 4 and 8 units respectively, or values corresponding to 1, 2, 2 and 4 units respectively. The permuted binary code 1, 2, 2′ and 4 is used in this instance.

If none of the latch-operating electro-magnets is actuated, the selectively expansile stop assembly blocks the movement of a yieldingly actuated printing control at an initial position, which is preferably the 0 position. The various members of the latch assembly remain interlocked in tandem to prevent any significant relative movement among the members. If any of the electro-magnets is energized, however, a corresponding pair of the successive members in the series is unlatched for limited relative movement between the two members of the pair to permit the yieldingly actuated printing control to progress correspondingly beyond the 0 position to a higher digit position.

For application of the invention to the operation of a printing mechanism of an adding machine or the like, one four-digit conversion matrix comprising an expansible assembly and for controlling electro-magnets is required for each digit printing unit. Since these digit printing units are closely spaced together, the problem arises of providing conversion matrices that may be correspondingly positioned close together to form a compact bank.

The invention meets this problem by using thin components for the expansile assembly and by mounting the thin components on a thin base plate for planar movement along the face of the plate. Thus the invention provides substantially two-dimensional conversion matrices which may be positioned as close together as required. This compactness is made possible by the further provision of openings in the base plates to clear the electro-magnets and by mounting flattened electro-magnets in these openings.

The various features and advantages of the invention may be understood by reference to the following detailed description and the accompanying drawings.

In the drawings, which are to be regarded as merely illustrative:

FIGURE 1 is a side elevation of the initial embodiment of the invention showing how a four-digit electro-mechanical conversion matrix may be operatively connected to a decimal digital printing unit of an adding machine or the like;

FIGURE 2 is a diagram showing how the selected permuted binary code is related to the decimal numbers that are to be printed;

FIGURE 3 is a somewhat enlarged fragmentary sectional view taken as indicated by the line 3—3 of FIGURE 1 showing how the conversion matrix is operatively connected to a printing rack of the adding machine;

FIGURE 4 is a fragmentary sectional view on an enlarged scale taken along the line 4—4 of FIGURE 1 showing how one end of a member of the expansible assembly is pivotally connected to an operating link;

FIGURE 5 is an enlarged portion of FIGURE 1 showing how a keeper pin extends through a slot of an operating link to hold the link against the face of the base plate, the head of the keeper pin being omitted to reveal the construction;

FIGURE 6 is an enlarged fragment of FIGURE 1 showing how a keeper pin is employed to hold the adjacent ends of two operating links against the face of the base plate, the head of the keeper pin being omitted;

*General Arrangement*

Figure 1:
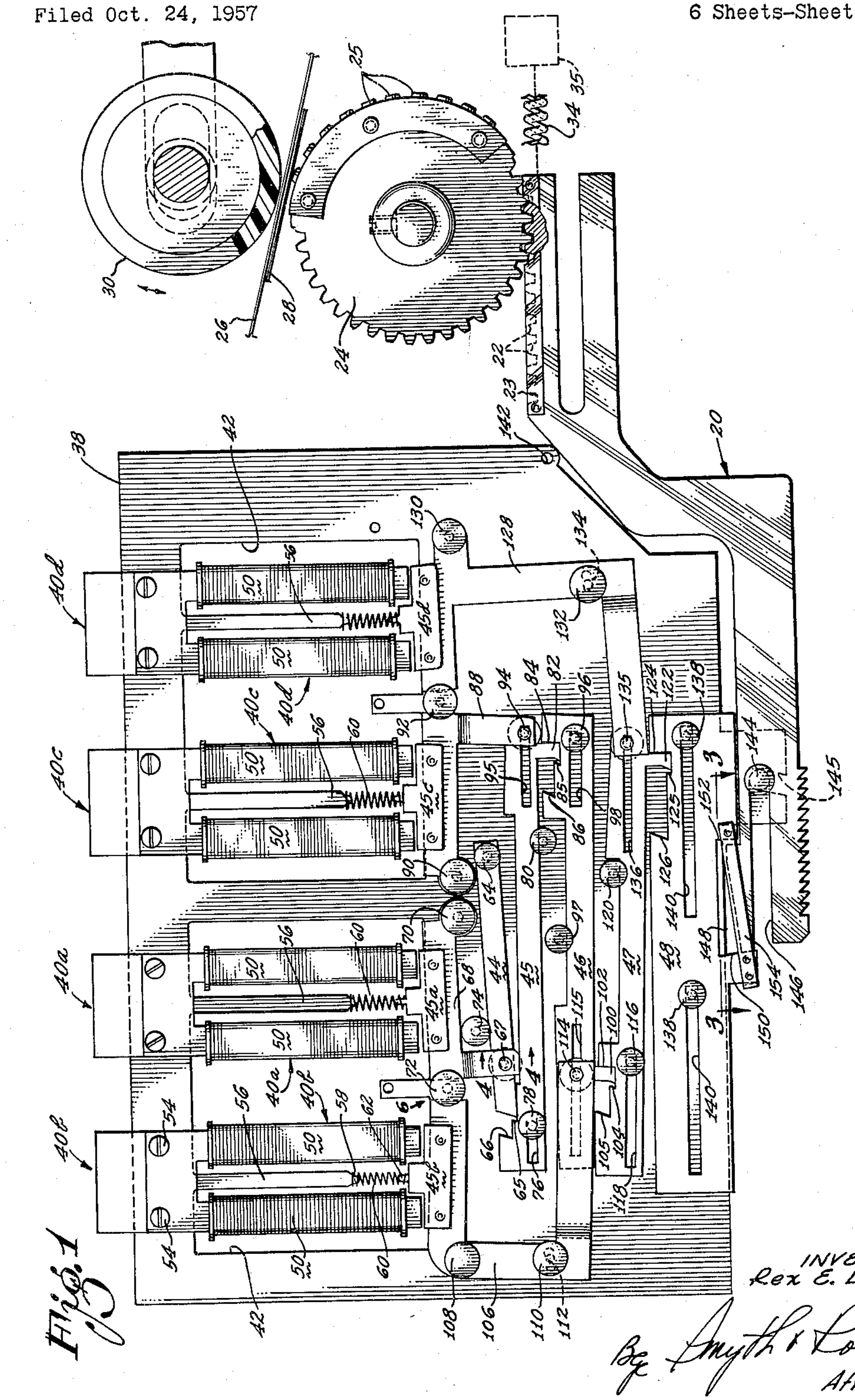

FIGURE 1 shows how an electro-mechanical converter matrix constructed in accord with the invention may be operatively connected to an adding machine of conventional construction to use the adding machine as a read-out device. The operative connection with the printing mechanism of the adding machine is accomplished by means of a rack member 20 which may be regarded as an output member. The rack member or converter rack 20 is adapted for longitudinal reciprocation and is provided with rack teeth 22 flanked by two guide strips 23. A printing wheel 24 meshing with the rack teeth 22 carries a series of printing indicia 25 comprising numerals 0–9. The printing wheel 24 is positioned under an intermittently advanced paper ribbon 26 with an intervening printing ribbon 28. When a selected printing numeral 25 on the printing wheel is placed in printing position, a rubber roller 30 carried by a movable bracket 32 shifts downward to press the two ribbons 26 and 28 against the printing indicia to cause a selected numeral to be printed on the underside of the paper ribbon 26. Thus the invention utilizes the conventional printing mechanism of the adding machine.

The converter rack 20 is shown in FIGURE 1 at its sub-zero position and it is apparent that only a slight movement is required to shift the first indicia 25 to the printing station to print "0" on the ribbon 26. The converter rack 20 is reciprocated from this starting sub-zero position to carry out a printing cycle and for this purpose is yieldingly connected by a tension spring 34 with a suitable reciprocative actuating means 35 which is indicated diagrammatically by dotted lines. Each reciprocation of the actuating means 35 covers the whole range of the ten printing indicia 25 but the spring 34 stretches to permit the converter rack 20 to be arrested in its rightward movement at any point in this range. The purpose of the converter matrix is to serve as a selective stop means for arresting the movement of the converter rack at different positions in this range.

Starting with the various components positioned as shown in FIGURE 1, a printing cycle is initiated by rightward movement of the reciprocative actuating means 35. The spring connection with the converter rack 20 causes the converter rack to move correspondingly to the right until it is stopped by the converter matrix to position a selected printing indicia 25 at the printing station under the two ribbons 26 and 28. When the reciprocative actuating means 35 reaches its rightward limit position with the converter rack 20 stopped at the selected position, the rubber roller 30 presses downward momentarily against the two ribbons 26 and 28 to print the selected numeral on the underside of the paper ribbon 26. The reciprocative actuating means 35 then returns to its starting position and in doing so returns the converter rack 20 to its starting position in a positive manner.

The printing wheels 24 of an adding machine or like device are spaced apart approximately 3/16 of an inch center to center and a feature of the present embodiment of the invention is that each of the converter matrices has a thickness of approximately the same magnitude so that the required gang of matrices occupies a space of approximately the same width as the gang of printing wheels. In the initial embodiment of the invention, the thickness of each converter matrix is less than 3/16 inch, the thickness being 0.17 inch.

Each converter matrix includes an upright base plate 38, a set of four electro-magnets **40*a*, 40*b*, 40*c* and 40*d* mounted in openings 42** in the base plate and an assembly of cooperative thin plate-like members movably mounted on the base plate for over-all expansion to a progressive series of selective limits determined by operation of the electro-magnets.

The expansible assembly comprises five members 44, 45, 46, 47 and 48. The first member 44 functions as a latch to control the longitudinal movement of the second member 45 relative to the first member. The longitudinally movable second member 45 is laterally movable at one end to function as a latch to control the longitudinal movement of the third member 46 relative to the second member. The longitudinally movable third member is laterally movable at one end to serve as a latch for controlling the longitudinal movement of the fourth member 47 relative to the third member. The longitudinally movable fourth member 47 is laterally movable at one end to serve as a latch for controlling longitudinal movement of the fifth member 48 relative to the fourth member. The fifth member 48 is movable longitudinally only and is directly connected to the converter rack 20.

Electro-magnet **40*a* is operatively connected to the first member 44 for releasing the second member 45 for a given magnitude of longitudinal movement relative to the first member. This magitude is one unit in the sense that the equivalent movement of the converter rack 20 causes rotation of the printing wheel 24 equivalent to the angular spacing of two successive printing indicia 25 on the printing wheel. The electro-magnet 40*c* is operatively connected to the second member 45 to cause lateral movement thereof for latching or unlatching the third member 46 for movement relative to the second member. The magnitude of this second range of relative movement is two units, corresponding to the movement of the printing wheel 24 that is required to bring two successive printing indicia 25 to the printing station. Electro-magnet 40*b* is operatively connected to the third member 46 to control lateral movements thereof for latching and unlatching the fourth member 47 for a range of longitudinal movement relative to the third member. This third range of relative movement has a magnitude of two units. Finally, the fourth electro-magnet 40*d* is operatively connected to the fourth member 47 for controlling lateral movements thereof to latch and unlatch the fifth member 48** for longitudinal movement relative to the fourth member. This fourth range of relative movement has a magnitude of four units.

The chart shown in FIGURE 2 shows how these four separate ranges of relative movement in the assembly of members 44—48 are used singly and in combination for conversion of binary digit signals into corresponding analogs of movement of the converter rack 20. The four columns in FIGURE 2 correspond respectively to the four electro-magnets **40*a* and 40*d*. Each of the four-place binary numerals is represented by one of the four electro-magnets, a binary digit 1 being represented by energization of the electro-magnet and a binary digit 0 being represented by nonenergization of the electro-magnet. It is apparent that energization of the four electro-magnets selectively in accord with the digits of the binary numerals will permit the assembly of members 44—48** to be expanded to limit positions corresponding to the respective decimal numerals represented by the binary numeral.

*Structural Details*

Each of the electro-magnets **40*a*—40*d* comprises a pair of flattened coils 50 mounted on the two legs of a U-shaped sheet metal core 52. Each of the cores 52 is suitably mounted on the base plate 38, for example by screws 54. The four cores are positioned to place the flattened coils 50 in the openings 42** of the base plate to keep the thickness of the base plate from being added to the thickness of the flattened coils in the overall thickness of the conversion matrix.

Associated with the pairs of poles of the four electro-magnets **40*a*—40*d* are corresponding armatures 45*a*, 45*b*, 45*c* and 45*d*. Since the base plate 38 is upright, the armatures 45*a*—45*c* are gravitationally biased toward their open positions. Preferably spring means are provided at the electro-magnets for cooperation with gravity to make sure that the various armatures take their open positions when the electro-magnets are de-energized. For this purpose each of the cores 52 may be formed with a central finger 56 having a reduced end portion 58. One end of a coil spring 60 seats on the reduced end portion 58 of each finger 56 and the other end of the spring seats on a lug 62** on the corresponding armature, the spring acting in compression to urge the armature downward.

The first member 44 of the expansible assembly is mounted by one end on the base plate 38 by a headed pivot pin 64. The opposite end of the member 44 serves as a latch pawl and for this purpose may be tapered as shown in the drawings for releasable engagement with an under-cut latch shoulder 65 of the second member 45. When the first member 44 is lifted clear of the latch shoulder 65 it cooperates with a second under-cut latch shoulder 66 of the second member 45 to permit a range of longitudinal movement of the second member relative to the first member, this range being the distance between the two latch shoulders 65 and 66.

The first member 44 is operatively connected by a pin 67 to an angular link 68 on which the armature 40*a* is rigidly mounted. The angular link 68 is pivoted on a headed pin 70 and is held against the surface of the base plate 38 by an overhanging headed retaining pin 72. Preferably an additional headed retaining pin 74 overhangs the member 44 for the same purpose.

One end of the second member 45 has a longitudinal slot 76 by means of which it is pivotally and slidingly mounted on a headed pivot pin 78. The other end of the second member 45 normally rests in a slidable manner on an overhanging headed retaining pin 80. The longitudinal slot 76 is of a length to permit the second member 45 to move longitudinally the distance between the two latch shoulders 65 and 66 and in addition to permit the latch shoulder 65 to be retracted slightly from the end of the first member 44 at the normal starting position of the member 45.

The right end of the second member 45 has a downwardly extending latch element 82 which normally rests against a stop shoulder 84 of the third member 46 with the latch element slightly retracted from an under-cut latch shoulder 85. If the swingable end of the latch member 45 is lifted to permit the latch element 82 to clear the latch shoulder 85, the latch element cooperates with a second under-cut latch shoulder 86. The longitudinal distance between the two latch shoulders 85 and 86 of the third member 46 permits a range of movement of the third member relative to the second member 45 equivalent to two units of rotation of the printing wheel 24.

The swingable end of the second latch member 45 is controlled by an angular link 88 on which the armature 45*c* is rigidly mounted. The angular link 88 is mounted on a headed pivot pin 90 and is held against the surface of the base plate 38 by an overhanging headed retaining pin 92. The angular link 88 is operatively connected to the second member 45 by a pivot 94 that extends through a longitudinal slot 95 of the second member, the purpose of the slot being to keep the pivot from interfering with the desired longitudinal relative movement of the third member.

The third member 46 is pivotally mounted on a headed pivot pin 96 and is overhung by a headed retaining pin 97. The pivot pin 96 extends through a slot 98 which is long enough to accommodate both the longitudinal movement of the second member relative to the first member and the additional longitudinal movement of the third member relative to the second member. The other end of the third member 46 provides a downwardly extending latch element 100 that normally rests against a stop shoulder 102 of the fourth member 47 at the starting position of the assembly, the latch element being slightly retracted from an under-cut latch shoulder 104.

When the swingable end of the third member 46 is lifted to raise the latch element 100 clear of the latch shoulder 104, the latch element cooperates with a second latch shoulder 105 to limit the longitudinal movement of the fourth member 47 relative to the third member. The longitudinal spacing of the two latch shoulders 104 and 105 is two printing units of rotation of the printing wheel 24.

The swingable end of the third member 46 is operated by a U-shaped link 106 to which the armature 45*b* is rigidly attached. The U-shaped link 106 is pivotally mounted on a headed pivot pin 108 and is held against the face of the base plate 38 by the previously mentioned headed retaining pin 72 and a second headed retaining pin 110. The retaining pin 110 extends through an arcuate slot 112 in the U-shaped link 106 as best shown in FIGURE 5. The U-shaped link 106 is operatively connected to the third member 46 by a pin 114 that extends through a longitudinal slot 115, the longitudinal slot preventing interference with the desired longitudinal movement of the third member 46.

The fourth member 47 is mounted on a headed pivot pin 116 by means of a longitudinal slot 118 which is long enough to permit the required range of longitudinal movement of the fourth member. This range includes the single unit of movement of the first member 44, the two units of relative movement of the second member 45 and finally the two units of relative movement of the third member itself.

A headed retaining pin 120 cooperates with the headed pivot pin 116 to hold the fourth member 47 against the surface of the base plate 38. The swingable end of the fourth member 47 is formed with a latch element 122 that normally abuts a stop shoulder 124 of the fifth member 48 in a position slightly retracted from an under-cut latch shoulder 125.

When the swingable end of the fourth member 47 is raised to lift the latch element 122 clear of the latch shoulder 125, the latch element cooperates with a second latch shoulder 126 to limit the movement of the fifth member 48 relative to the fourth member 47. The longitudinal distance between the two latch shoulders 125 and 126 is four units of rotation of the printing wheel 24.

The fourth member 47 is operatively connected to the armature 45*d* of the fourth electro-magnet 40*d* by an angular link 128 on which the armature is fixedly mounted. The angular link 128 is pivotally mounted on a headed pivot pin 130 and is held against the base plate 38 by the previously-mentioned headed retaining pin 92 and a second headed retaining pin 132. The second retaining pin 132 extends through an arcuate slot 134 in the angular link. The angular link 128 is operatively connected to the fourth member 47 by a pin 135 that extends through a longitudinal slot 136 of the member.

The fifth member 48 of the series is slidingly mounted on the base plate 38 for longitudinal movement only. In the construction shown, the fifth member 48 is mounted by a spaced pair of headed retaining pins 138 which extend through corresponding longitudinal slots 140. The two slots 140 are long enough for the fifth member to cause at least ten units of rotation of the printing wheel 24.

As best shown in FIGURE 4 where a pin 67, 94, 114 or 135 pivotally connects an operating link to a corresponding member 44, 45, 46 or 47, the base plate may be provided with a circular aperture 141 to clear the pin. The clearance is adequate to accommodate the required range of vertical and horizontal movement of the pin. The gang of base plates is supported by a first cross rod 142 and a second cross rod 144, the lower edges of the base plates having slots 145 straddling the cross rod 144. Each of the converter racks 20 is slidingly supported by the lower cross rod 144 and for this purpose is formed with a longitudinal slot that straddles the cross rod. Each of the converter racks 20 is longitudinally movable in the same plane as the corresponding fifth member 48.

Each of the converter racks 20 is releasably interlocked with the corresponding fifth member 48 by being formed with an upwardly extending tongue 148 that extends between two downwardly extending shoulders 150 and 152 of the fifth member. As shown in FIGURES 1 and 3, the two shoulders 150 and 152 are spanned on opposite sides of the fifth member by a pair of thin side strips 154 which maintain the tongue 148 of the converter rack in the same plane as the two shoulders.

*Operation*

The manner in which the invention operates to serve its purpose may be readily understood from the foregoing description.

Figure 7:
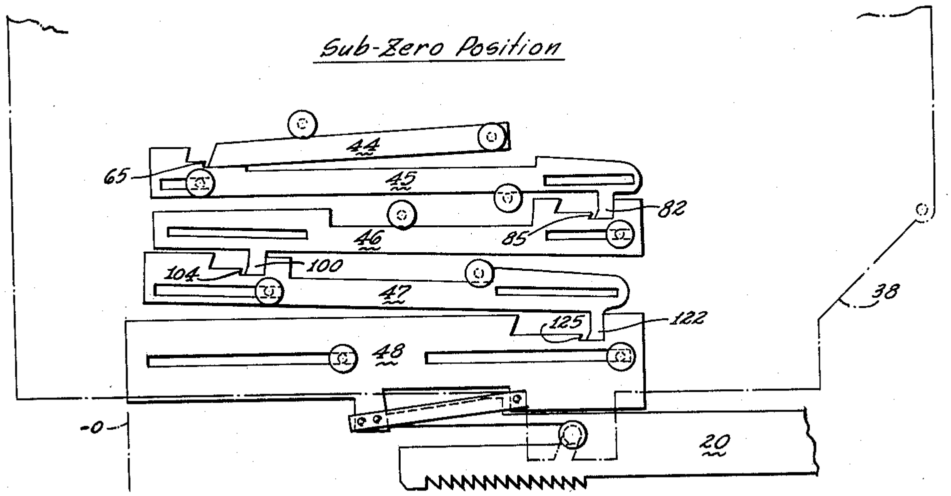
FIGURE 7 is a simplified front elevational view of the expansible assembly contracted to its normal starting or sub-zero position.
Figure 8:
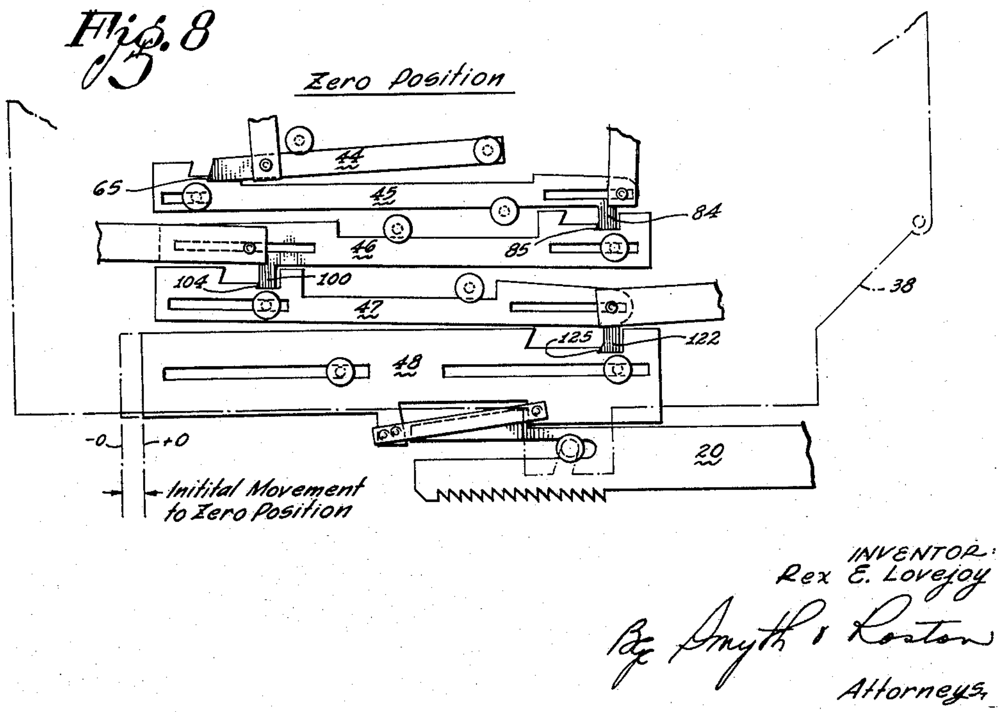
FIGURE 8 is a similar view showing the assembly shifted to the right to its zero position, the assembly being tightened to take up lost motion or backlash without any significant expansion of the assembly.

The normal or sub-zero starting positions of the members 44—48 and the converter rack 20 are shown in FIGURES 1 and 7. It will be noted that four clearances are involved, namely, the clearance between the end of the first member 44 and the latch shoulder 65 of the second member 45, the clearance between the latch element 82 of the second member and the latch shoulder 85 of the third member 46, the clearance between the latch element 100 of the third member and the latch shoulder 104 of the fourth member 47, and the clearance between lach element 122 of the fourth member and the latch shoulder 125 of the fifth member 48. It is apparent that if a printing cycle is carried out in accord with binary number 0000 to print decimal numeral zero none of the four electromagnets is energized and the rightward movement of the converter rack 20 is arrested when all four of these clearances have been taken up. The disappearance of these clearances places the first or zero decimal indicia 25 on the printing wheel 24 at the printing station. FIGURE 8 indicates the extent of this initial increment of movement of the converter rack 20 which places the latch shoulder 65 of the second member against the end of the first member 44 and places the latch shoulders 85, 104 and 125 in abutment against the corresponding latch elements 82, 100 and 122.

Figure 9:
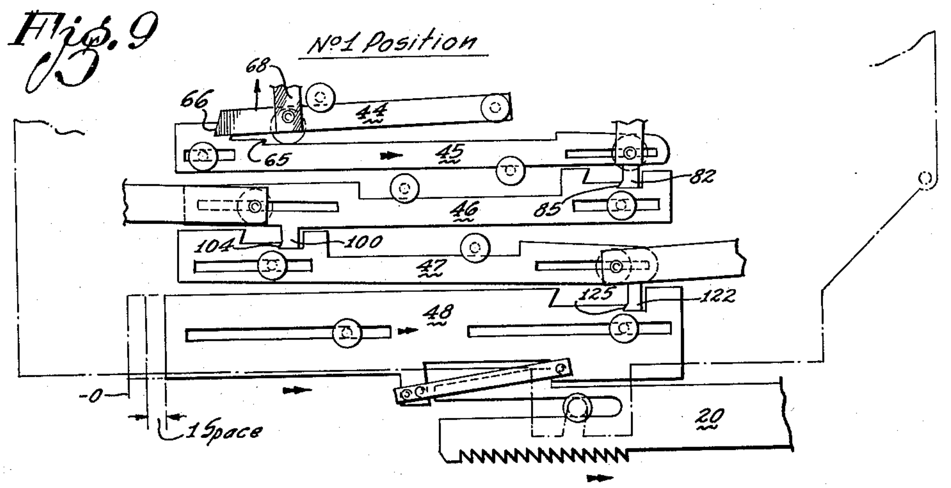
FIGURES 9 to 17 are similar views showing the assembly expanded progressively to positions representing the decimal digits 1 to 9 respectively.

If the second binary number 1000 of the chart in FIGURE 2 is used as an input signal, the resulting energization of electro-magnet 40*a* lifts the end of the first member 44 clear of the first latch shoulder 65 of the second member 45, whereupon reciprocation of the actuating means 35 results in rightward movement of the converter rack 20 one printing unit beyond the zero position, the converter rack being arrested in its rightward movement at the position for printing decimal numeral 1. This position of the converter rack 20 and the corresponding postions of the members 44—48 are shown in FIGURE 9 where the end of the first member 44 abuts the second latch shoulder 66 of the second member 45 to limit the rightward movement of the printing rack. The latch elements 82, 100 and 122 abut the corresponding latch shoulders 85, 104 and 124 to prevent further rightward movement of the converter rack.

Figures 10, 11:
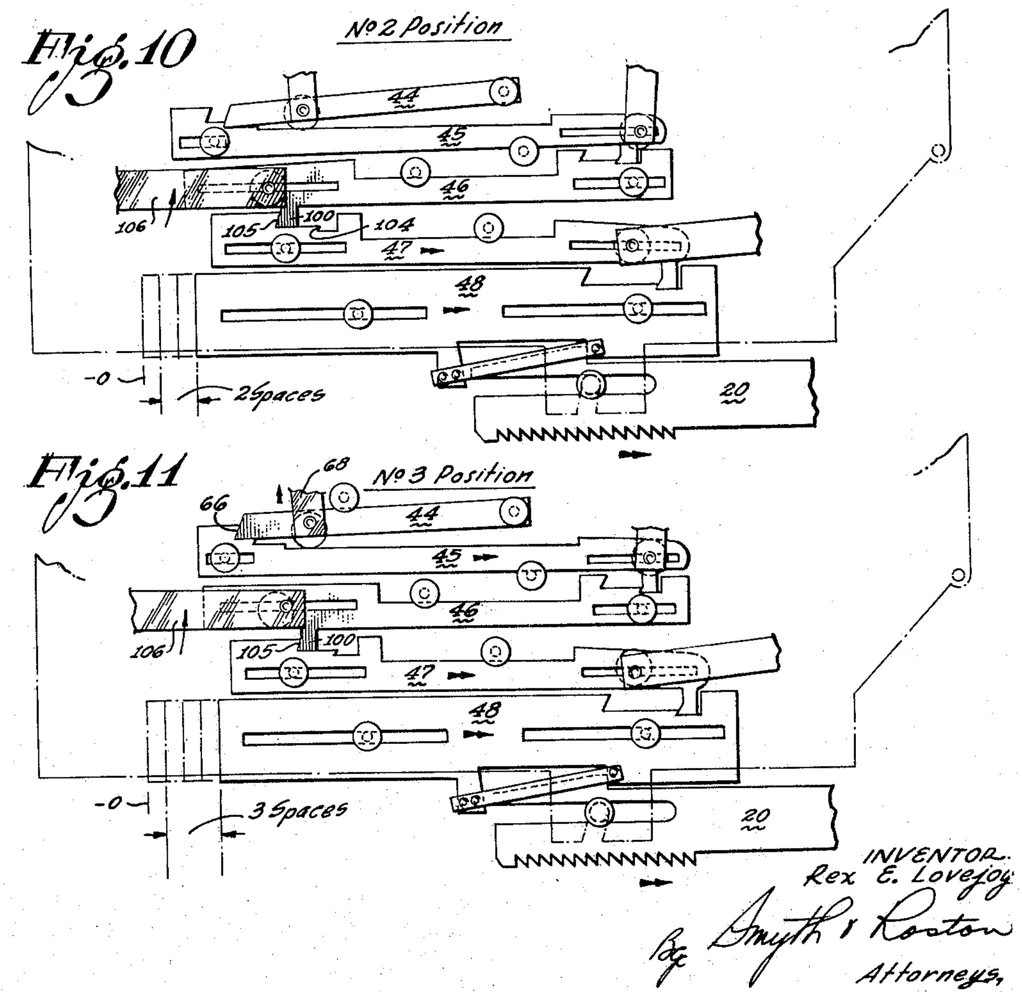

Input of a signal representing binary number 0100 corresponding to decimal numeral 2 results in energization of electro-magnet 40*b* with consequent lifting of the latch element 100 of the third member 46 clear of the latch shoulder 104 of the fourth member 47 to permit the conversion rack 20 to move to the right to the position shown in FIGURE 10 for printing decimal numeral 2. The conversion rack is arrested at this position by abutment of the latch element 100 against the second latch shoulder 105 of the fourth member 47. The first member 44 and the latch elements 82 and 122 abut the latch shoulders 65, 85 and 125 respectively to prevent further rightward movement of the conversion rack.

When the binary number 1100 is signaled to energize electro-magnets 40*a* and 40*b*, the first member 44 and the third member 46 are lifted to cause the printing rack 20 to be arrested at the position shown in FIGURE 11 for printing decimal numeral 3. One unit of movement is provided by the rightward movement of the second member 45 to bring the latch shoulder 66 against the end of the first member 44 and the remaining two units of movement are provided by the rightward movement of the fourth member 47 to bring the latch shoulder 105 of the fourth member against the latch element 100. The latch elements 82 and 122 abut the latch shoulders 85 and 125 respectively to prevent further rightward movement of the printing rack.

Figures 12, 13, 14:
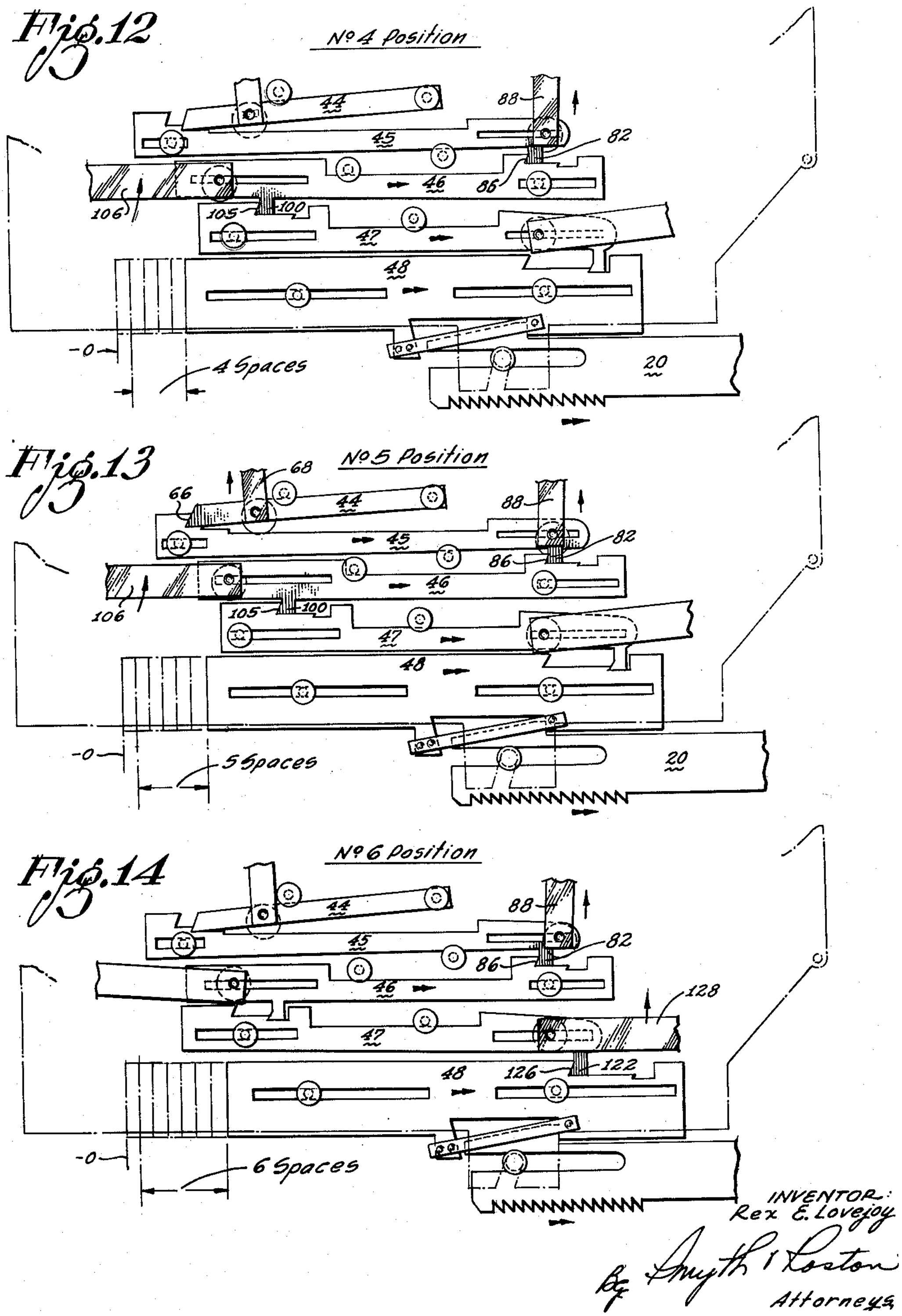

When the binary numeral 0110 designating decimal numeral 4 is signaled to energize electro-magnets 40*b* and 40*c*, the conversion rack 20 moves rightward to the position shown in FIGURE 12, the latch elements 82 and 100 being lifted to permit this degree of movement. Two of the four required units of movement are provided by rightward shift of the third member 46 to place the latch shoulder 86 in abutment with the latch element 82 and the other two units are provided by rightward shift of the fourth member 47 to place the latch shoulder 105 in abutment against the latch element 100.

When electro-magnets 40*a*, 40*b* and 40*c* are energized to signal binary numeral 1110, the conversion rack 20 moves five units beyond the zero position to the position shown in FIGURE 13 where the first member 44 is lifted for abutment against the latch shoulder 66, the latch element 82 is lifted for abutment against the latch shoulder 86 and latch element 100 is lifted for abutment against the latch shoulder 105. Thus the five units of movement beyond the zero position are provided by a one unit rightward shift of the second member 45, an additional two unit rightward shift of the third member 46 relative to the second member 45 and a final two unit shift of the fourth member 47 rightward relative to the third member 46.

Energization of the electro-magnets 40*c* and 40*d* in response to the binary signal 0011 results in the conversion rack 20 being arrested at the position shown in FIGURE 14 for printing of decimal numeral 6. Two of the required units of movement beyond the zero position are provided by lifting of the latch element 82 to permit the third member 46 to shift rightward relative to the second member 45 and the remaining four units are provided by lifting of the latch element 122 to permit rightward shift of the fifth member 48 relative to the fourth member 47.

Figure 15:
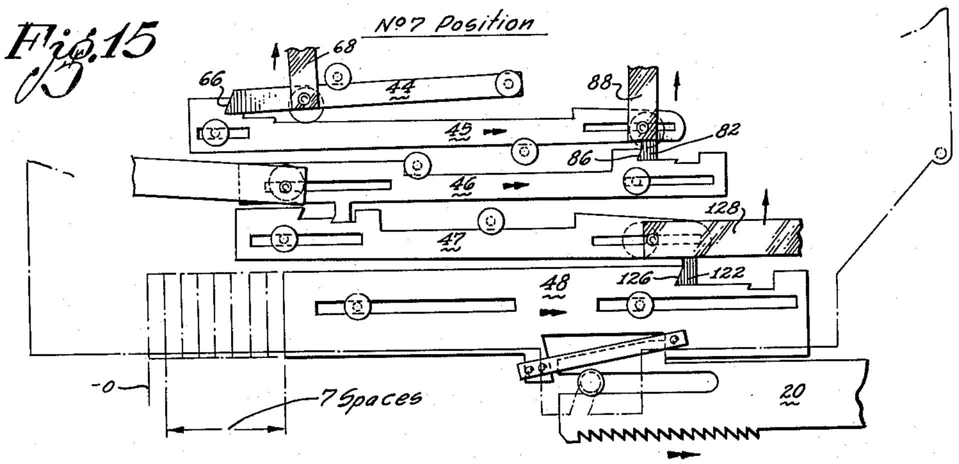

FIGURE 15 shows the result of signalling binary number 1011 for printing of decimal numeral 7, the signal resulting in energization of electro-magnets 40*a*, 40*c* and 40*d*. One of the seven units of relative motion is provided by lifting of the first member 44 to permit rightward shift of the second member 45; two additional units of relative movement are provided by lifting the second member 45 to permit rightward shift of the third member 46 relative to the second member; and the remaining four units of relative movement are provided by lifting the fourth member 47 to permit the fifth member 48 to shift rightward relative to the fourth member.

Figure 16:
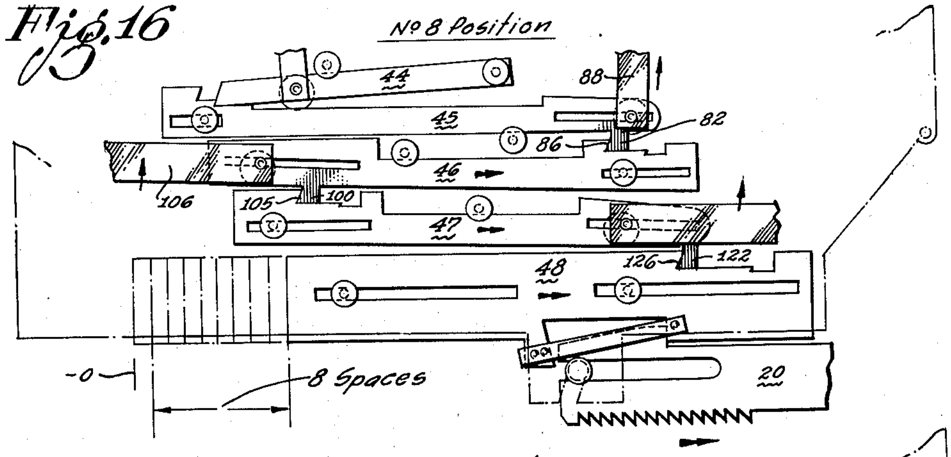

Electro-magnets 40*b*, 40*c* and 40*d* are energized by signalling of binary numeral 0111 to cause the conversion rack 20 to be arrested at the position shown in FIGURE 16 for printing of decimal numeral 8. Two units of the required total of eight units of movement are provided by rightward shift of the second member 45; two additional units are provided by rightward shift of the third member 46 relative to the second member 45; and the final four units are provided by rightward shift of the fifth member 48 relative to the fourth member 47.

Figure 17:
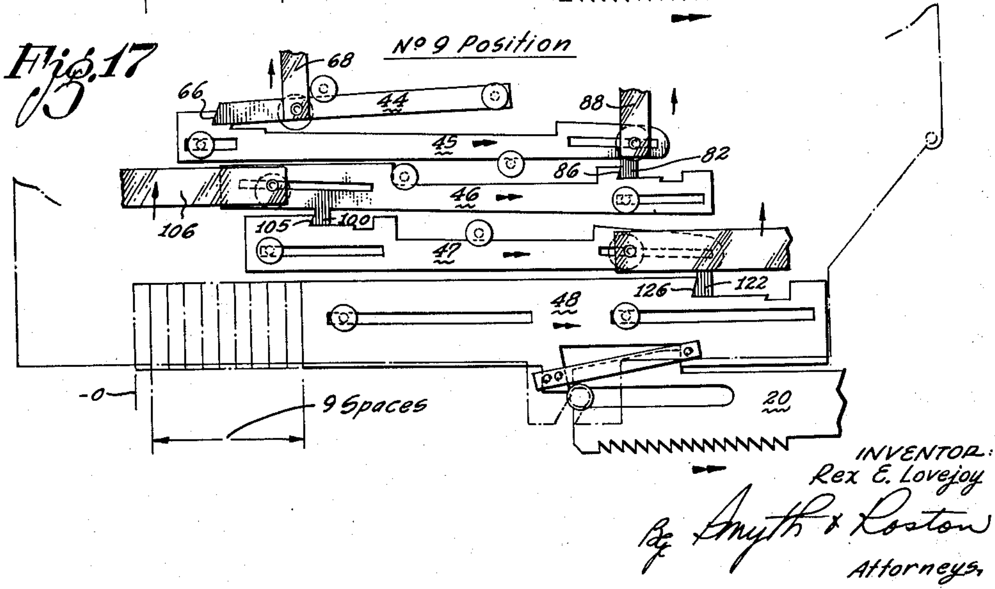

FIGURE 17 shows the conversion rack 20 arrested at the position for printing decimal numeral 9 in response to energization of all four of the electro-magnets 40*a*–40*d* when the binary number 1111 is signaled. Each of the four longitudinally movable members is released for its relative movement to provide the required nine units.

During the return movement of the conversion rack 20, all of the electro-magnets 40*a*–40*d* are de-energized so that both gravity and the springs 60 may urge the armatures 45*a*–45*d* to their normal lower open positions. During this return movement of the conversion rack 20 the fifth member 48 moves with the conversion rack since it is directly connected thereto. The stop shoulder 124 of the fifth member abuts the latch element 122 to return the fourth member 47 to its starting position; the stop shoulder 102 of the fourth member abuts the latch element 100 to return the third member 46 to its starting position; the stop shoulder 84 of the third member abuts the latch element 82 to return the second member 45 to its starting position.

All of the latch elements drop to their latching or engagement positions in response to this restoration of the members of the assembly to their starting positions. Thus the latch element 122 drops down to the level of the latching shoulder 125; the latch element 100 drops down to the level of the latch shoulder 104; the latch element 82 drops down to the level of the latch shoulder 85; and finally the swinging end of the first member 44 drops down to the level of the latch shoulder 65.

It is apparent that the expansible assembly has a series of lost-motion connections, each of which provides for a range of relative movement between parts of the assembly and that these relative movements are additive. Latches corresponding to the lost-motion connections normally prevent the corresponding relative movements but are operable selectively to permit the relative movements. Thus the over-all dimension of the assembly in any given operating cycle depends on how the latches are operated selectively.

My description in specific detail of the selected embodiment of the invention will suggest various changes, substitutions and other departures from my disclosure within the spirit and scope of the appended claims. For example, it is obvious that the sequence of the printing indicia 25 on the printing wheel 24 may be reversed and it is also obvious that the starting state of the assembly of members 44—48 may be the expanded state instead of the contracted state. It is further obvious that the electro-magnets may be arranged for energization to prevent the corresponding relative movements instead of being energized to permit the relative movements.

I claim:

1. A converter for digital-to-analog conversion to represent a range of values, including, a plurality of matrix means each movable in a first direction through a selected distance to individually represent particular portions of the range of values and to represent in combination the total range of values, the matrix means in the plurality being disposed in adjacent relationship to one another, each particular one of the matrix means in the plurality having shoulder portions to control the movement of the matrix means in the first direction, the matrix means in the plurality having latching portions engageable with the shoulder portions on the adjacent matrix means to limit the movements of the adjacent matrix means in the first direction, the matrix means in the plurality being pivotable to release the latching portions from engaging relationship with the shoulder portions on the adjacent matrix means in the plurality and to free the adjacent matrix means in the plurality for movement through the selected distances, output means coupled to a particular one of the matrix means in the plurality to obtain a movement of the different matrix means in the plurality in the first direction in accordance with the release of the latching portions on the matrix means in the plurality from the shoulder portions on the adjacent matrix means in the plurality, and a plurality of energizing means each operative upon a different one of the latching portions in the plurality to obtain a release of that latching portion from the shoulder portion on the adjacent matrix means in the plurality.

2. The converter set forth in claim 1 in which the energizing means in the plurality comprise electro-mechanical actuators.

3. The converter set forth in claim 1 in which said output means includes a member coupled to the particular one of the matrix means in the plurality and further includes a reciprocative actuator movable through a full range corresponding to the range of values represented by the converter and further includes means yieldably connecting the reciprocative actuator to the output member to obtain a disposition of the output member at intermediate positions in its range of movement upon a full range of movement of the reciprocative actuator.

4. A converter for digital-to-analog conversion to represent a range of values, including, a plurality of matrix means each movable in a first direction through a selected distance having a particular digital representation in the digital range to combine with the other matrix means in the plurality to represent the different values in the range, the matrix means in the plurality being disposed in adjacent relationship to one another, each of the matrix means having first and second shoulder portions at one end to limit movement of the matrix means in the first direction, the first and second shoulder portions on each of the matrix means in the plurality being separated by a distance corresponding to the selected distance for the movement of the matrix means in the first direction, the matrix means also having latching portions disposed in co-operative relationship with the first and second shoulder portions on an adjacent one of the matrix means in the plurality, each particular one of the matrix means being movable between first and second positions and being disposed in the first position in co-operative relationship with the first shoulder portion on the adjacent matrix means in the plurality and being disposed in the second position in co-operative relationship with the second shoulder portion on the adjacent matrix means in the plurality to obtain a movement of the adjacent matrix means in the plurality through an additional distance corresponding to the distance between the first and second shoulder portions on the adjacent matrix means, output means movable in the first direction and coupled to a particular one of the matrix means in the plurality for movement through a cumulative distance dependent upon the disposition in the second position of the latching portions on the different matrix means in the plurality, and a plurality of energizing means each controlling the movements of a different one of the matrix means in the plurality in the first direction and each operative when energized to obtain a disposition of the latching portion on a particular one of the matrix means from the first shoulder portion on the adjacent matrix means in the plurality to the second shoulder portion on the adjacent matrix means in the plurality.

5. The converter set forth in claim 4 in which the latching portions are movable between the first and second positions in a second direction transverse to the first direction and in which the second shoulder portions are displaced in the second direction from the corresponding first shoulder portions on the matrix means in the plurality to engage the latching portions upon a movement of the associated latching portions to the second positions.

6. The converter set forth in claim 4 in which the output means include a member coupled to the particular one of the matrix means in the plurality for movement in the first direction and further include an actuator movable through a full range of displacement corresponding to the range of values indicated by the converter and further include means yieldably coupling the output member and the actuator for displacement of the output member through intermediate distances upon a displacement of the actuator through the full range of movements.

7. A converter for digital-to-analog conversion to represent a range of values, including, a plurality of matrix means each movable in a first direction through a selected distance having a particular digital representation to combine with movements of other means in the plurality to represent all of the values in the particular range, the matrix means in the plurality being disposed in adjacent relationship to one another, the matrix means having first latching portions at first positions on the matrix means and having second latching portions at second positions on the matrix means, the first latching portion on particular matrix means in the plurality being disposed in interlocking relationship with the second latching portion on the adjacent matrix means in the plurality to prevent the movement of the adjacent matrix means in the first direction and to provide for a movement of the adjacent matrix means in the first direction upon a displacement in a second direction transverse to the first direction of the first latching portion on the particular matrix means relative to the second latching portion on the adjacent matrix means, a plurality of means each controlling the movements of a different one of the matrix means in the plurality in the first direction and operative upon being energized to obtain a movement of a particular one of the matrix means in the plurality in the second direction for a release of the adjacent matrix means in the plurality for movement in the first direction, and output means coupled to the matrix means in the plurality to obtain a movement of the output means through a total distance dependent upon the release of the first latching means from the second latching portions in the different matrix means in the plurality.

8. The converter set forth in claim 7 in which the matrix means in the plurality are biased for normal disposition of the associated latching portions in their first positions and in which the energizing means in the plurality are electrically excited.

9. The converter set forth in claim 7 in which the matrix means in the plurality are biased for normal disposition of the associated latching means in their first positions and in which the output means includes a member operatively coupled to the particular one of the matrix means in the pluarality for movement in the first direction and further includes actuating means movable through a distance representing the range of values of the converter and further includes resilient means coupling the output member and the actuating means to provide for a movement of the output member through any required distance less than that of the actuating means.

10. A converter for digital-to-analog conversion to represent a range of values, including, a plurality of matrix means each movable in a first direction through a selected distance to individually represent particular portions of the range of values and to represent in combination the total range of values in accordance with the movement of the different matrix means in the plurality in the first direction, the matrix means in the plurality being disposed in adjacent relationship to one another, each of the matrix means in the plurality having first and second shoulder portions displaced from each other in the first direction by the selected distance, there being a plurality of latching portions on the different matrix means in the plurality, the matrix means in the plurality being pivotable between first and second positions to obtain first and second pivotal positions of the latching portions, each of the latching portions in the plurality being disposed in engaging relationship with the first shoulder portion on a different one of the matrix means in the plurality in the first pivotal position of the latching portion to limit the movement of that matrix means in the first direction and being disposed in engaging relationship with the second shoulder portion on that matrix means in the second pivotal position of the latching portion, an output member coupled to a particular one of the matrix means in the plurality and movable in the first direction through a distance dependent upon the engagement of the different latching portions in the plurality with the associated one of the first and second shoulder portions in the plurality, and a plurality of energizing means each operatively coupled to the matrix means in the plurality to obtain a pivotal displacement of a different one of the latching portions from the first position to the second position.

11. The converter set forth in claim 10 in which the first shoulder portions in the plurality are displaced in a second direction transverse to the first direction from the associated ones of the second shoulder portions in the plurality and in which the matrix means in the plurality are biased in the second direction to maintain a normal engagement between the latching portions in the plurality and the associated ones of the first shoulder portions in the plurality.

12. The converter set forth in claim 10 in which the energizing means in the plurality constitute electromagnetic actuators which overcome, upon being energized, the bias imposed on the matrix means in the plurality to obtain a pivotal movement of the matrix means for a pivotal disposition of the latching means in the plurality in the second position.

References Cited in the file of this patent

UNITED STATES PATENTS

| | | |
|---|---|---|
| 1,163,688 | Rice | Dec. 14, 1915 |
| 1,938,899 | Gilman | Dec. 12, 1933 |
| 2,770,415 | Lindesmith | Nov. 13, 1956 |